United States Patent [19]

Hamagishi et al.

[11] Patent Number: 5,640,273
[45] Date of Patent: Jun. 17, 1997

[54] THREE-DIMENSIONAL DISPLAY PANEL AND THREE-DIMENSIONAL DISPLAY USING THE SAME

[75] Inventors: Goro Hamagishi; Masahiro Sakata; Kenji Yamauchi; Atsuhiro Yamashita; Naoki Matsushita, all of Osaka-fu; Ken Mashitani, Nara-ken, all of Japan

[73] Assignee: Sanyo Electric Co., Ltd., Osaka, Japan

[21] Appl. No.: 411,303

[22] Filed: Mar. 27, 1995

[30] Foreign Application Priority Data

Mar. 28, 1994 [JP] Japan ................................. 6-057150

[51] Int. Cl.$^6$ ............ G02B 27/22; G02F 1/1343; G09G 3/20; G09G 3/36
[52] U.S. Cl. .................. 359/462; 359/463; 359/464; 345/55; 345/87; 349/145
[58] Field of Search .................. 359/462, 464, 359/465, 466, 61, 67; 348/54, 55, 56, 57, 58, 59; 345/31, 100, 55, 121, 87

[56] References Cited

U.S. PATENT DOCUMENTS

| | | | |
|---|---|---|---|
| 3,063,333 | 11/1962 | Pareto | 359/462 |
| 4,829,365 | 5/1989 | Eichenlaub | 358/3 |
| 4,957,351 | 9/1990 | Shioji | 359/462 |
| 5,264,964 | 11/1993 | Faris | 359/465 |
| 5,315,377 | 5/1994 | Isono et al. | 348/51 |

*Primary Examiner*—Paul M. Dzierzynski
*Assistant Examiner*—Audrey Chang
*Attorney, Agent, or Firm*—Nikaido, Marmelstein, Murray & Oram LLP

[57] ABSTRACT

The present invention is directed to a three-dimensional display panel capable of viewing a three-dimensional image without using special glasses. The three-dimensional display panel comprises an image display panel having a column of right eye pixels arranged with predetermined spacing in the longitudinal direction on a screen and a column of left eye pixels arranged with predetermined spacing in the longitudinal direction on the screen and so adapted that the column of right eye pixels and the column of left eye pixels are arranged alternately in close proximity to each other in the horizontal direction on the screen and are shifted from each other in the longitudinal direction on the screen to ensure a region where means for switching the respective pixels is formed, and image separating means for separating light from the right eye pixels and light from the left eye pixels to be respectively incident on the right eye and the left eye of a viewer.

20 Claims, 11 Drawing Sheets

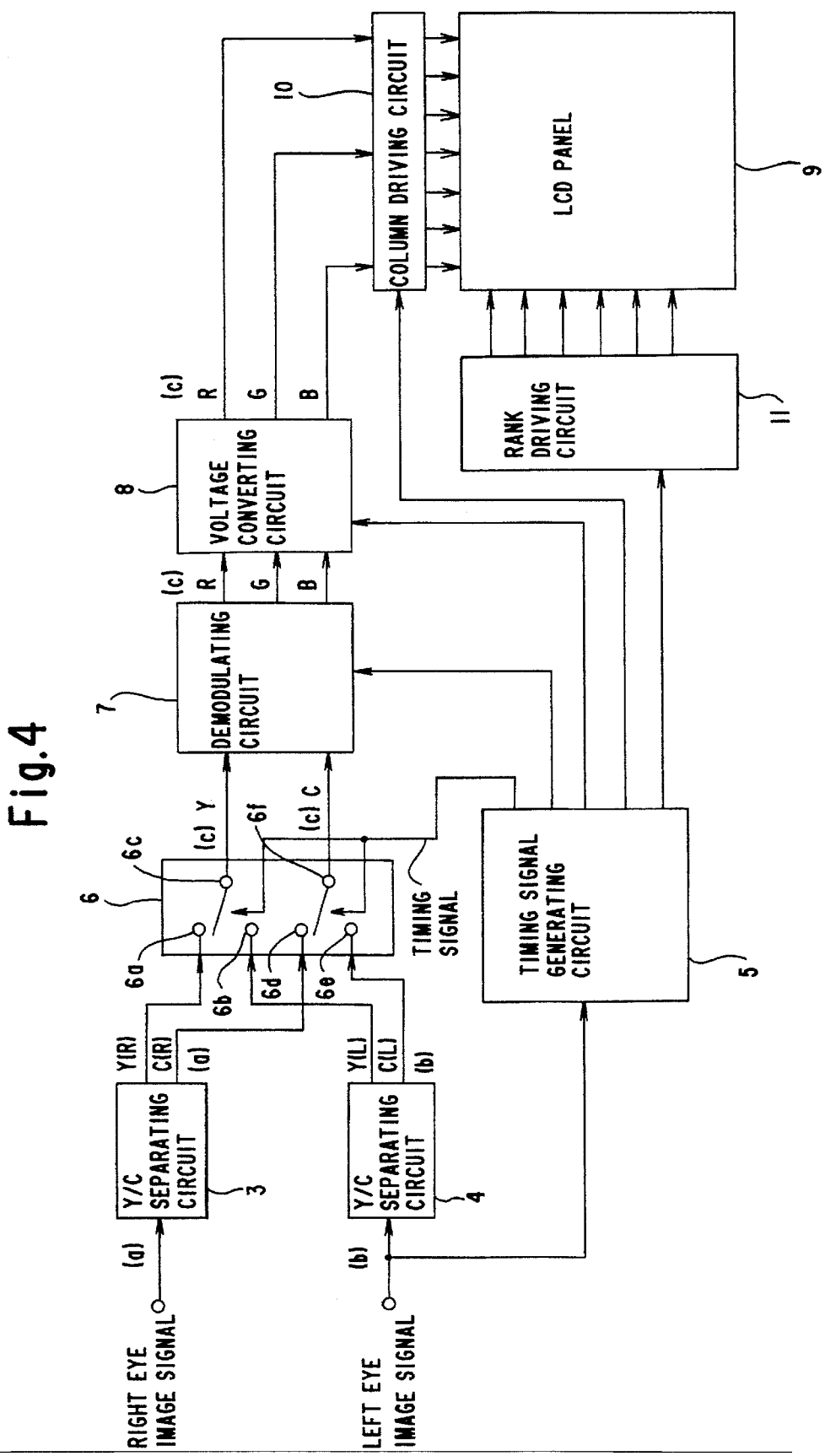

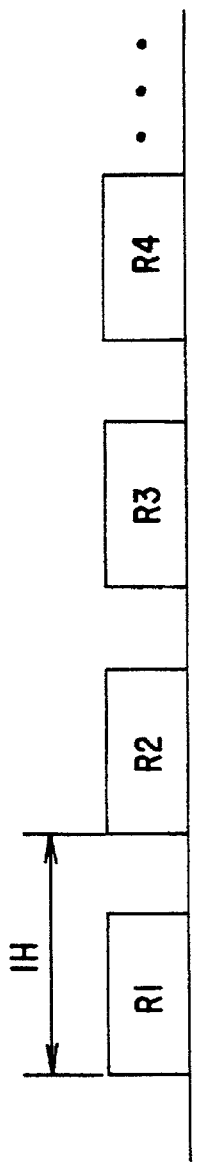
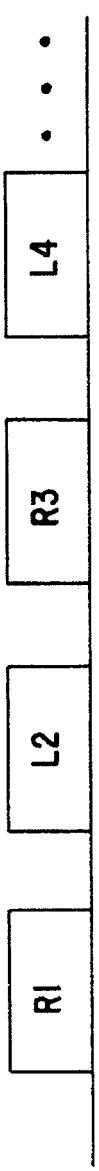
Fig. 5a SIGNAL AT POINT (a) IN Fig.4 (RIGHT EYE IMAGE SIGNAL)
Fig. 5b SIGNAL AT POINT (b) IN Fig.4 (LEFT EYE IMAGE SIGNAL)
Fig. 5c SIGNAL AT POINT (c) IN Fig.4 (COMPOSITE IMAGE SIGNAL)

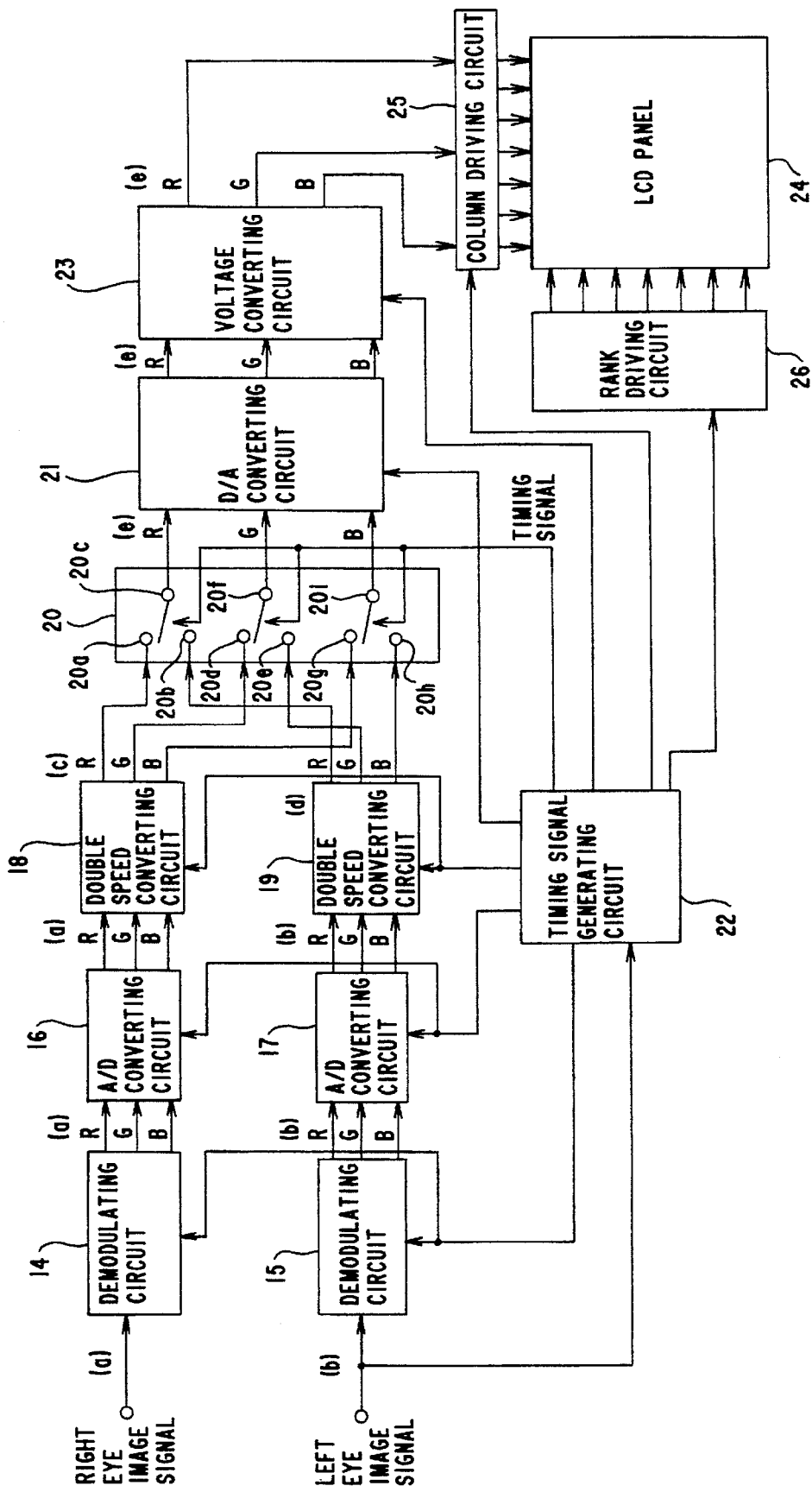

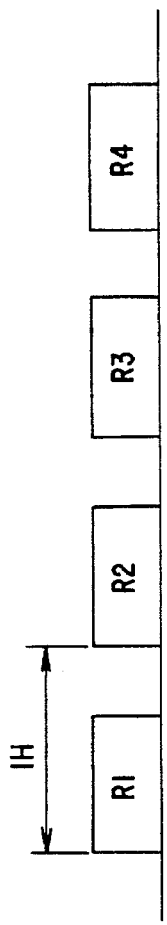
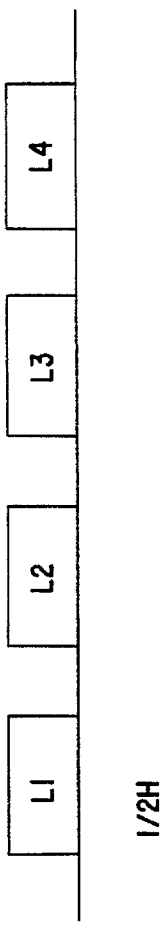
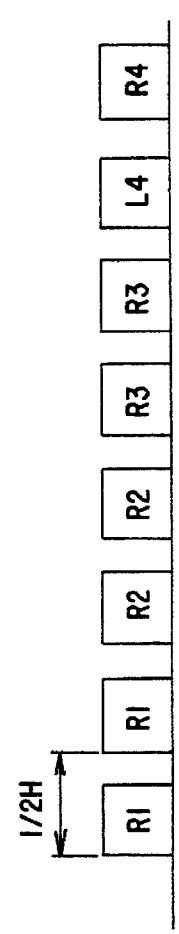
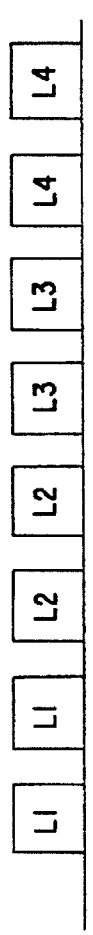
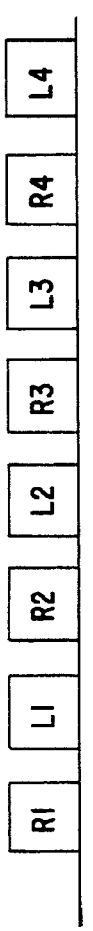
Fig. 7a  SIGNAL AT POINT (a) IN Fig.6 (RIGHT EYE IMAGE SIGNAL)
Fig. 7b  SIGNAL AT POINT (b) IN Fig.6 (LEFT EYE IMAGE SIGNAL)
Fig. 7c  SIGNAL AT POINT (c) IN Fig.6 (RIGHT EYE COMPRESSED IMAGE SIGNAL)
Fig. 7d  SIGNAL AT POINT (d) IN Fig.6 (LEFT EYE COMPRESSED IMAGE SIGNAL)
Fig. 7e  SIGNAL AT POINT (e) IN Fig.6 (COMPRESSED IMAGE SIGNAL)

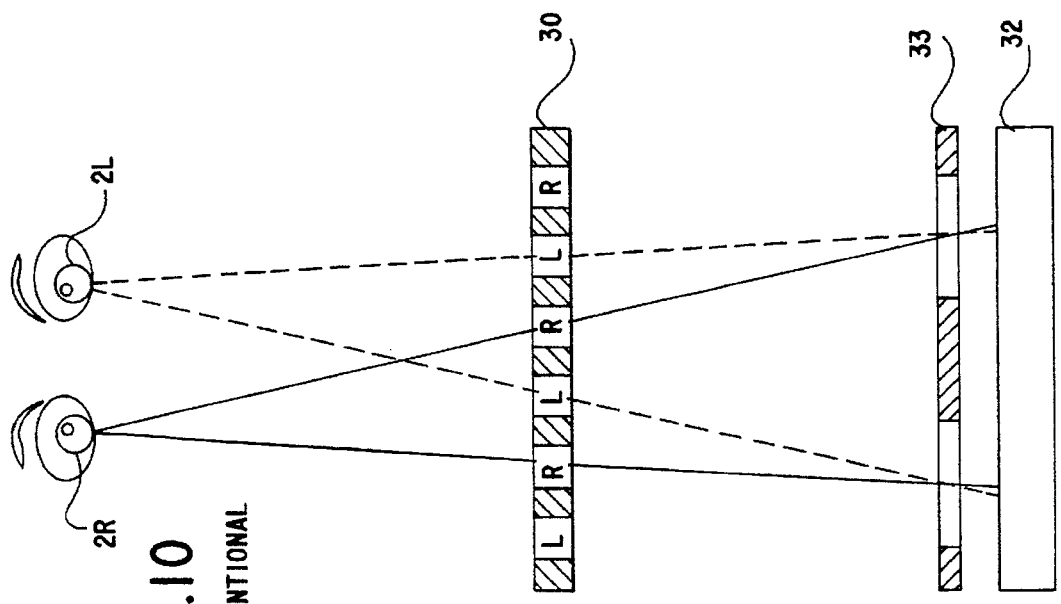
Fig.10 CONVENTIONAL
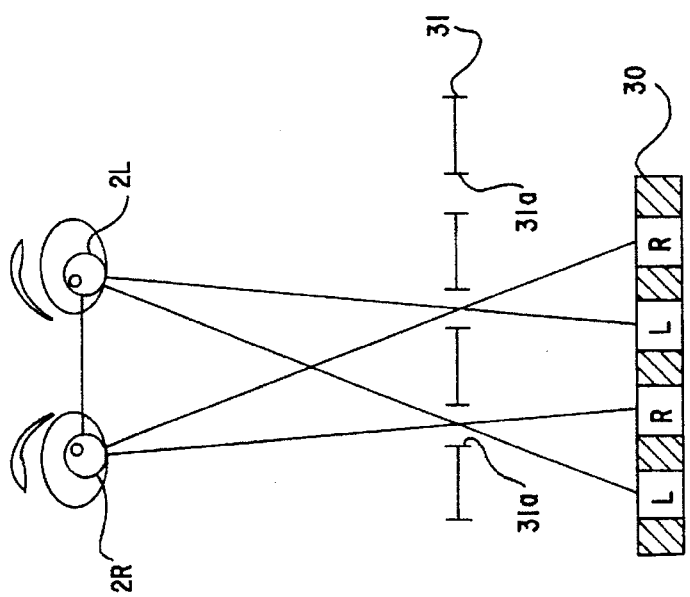
Fig.9 CONVENTIONAL

Fig.11
CONVENTIONAL
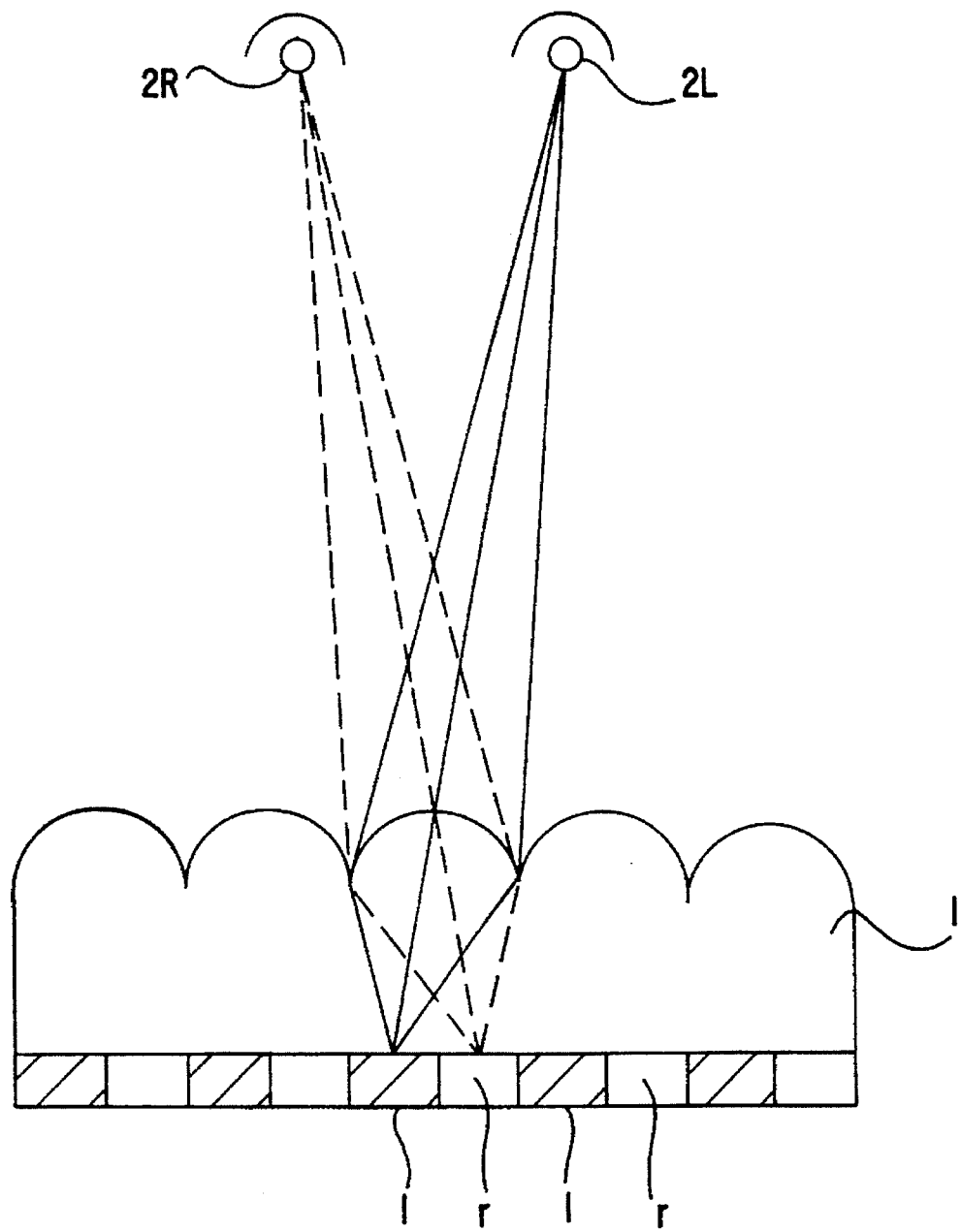

Fig.12
CONVENTIONAL
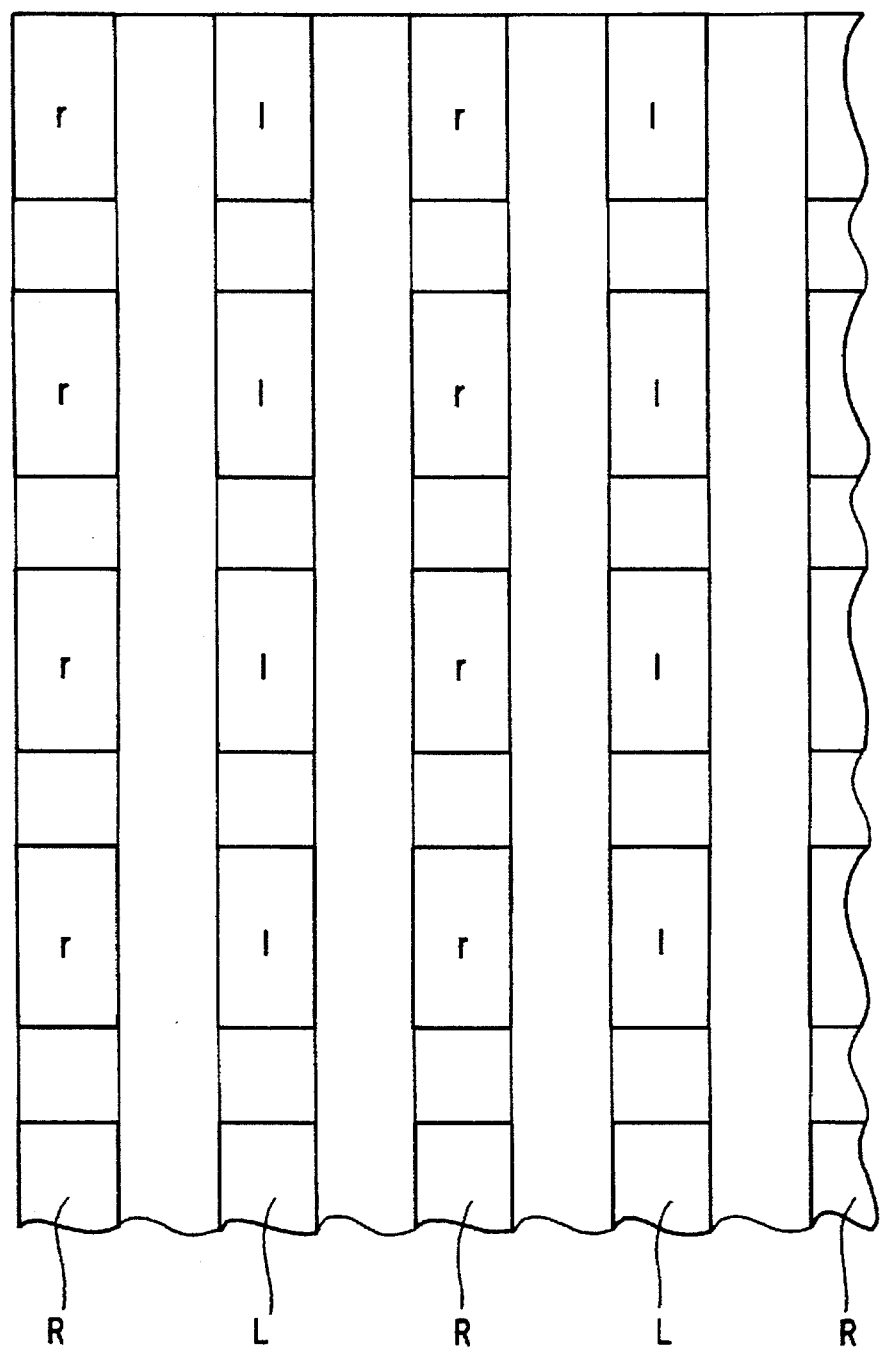

THREE-DIMENSIONAL DISPLAY PANEL AND THREE-DIMENSIONAL DISPLAY USING THE SAME

BACKGROUND OF THE INVENTION

1. Field of the Invention

The present invention relates to a three-dimensional display panel and a three-dimensional display using the same capable of viewing a three-dimensional image without using special glasses.

2. Description of the Prior Art

There are methods of viewing a three-dimensional image without using special glasses. Examples of this method include a lenticular method, a parallax barrier method and a method of slitting a light source.

FIG. 9 is a schematic view showing the principle of displaying a three-dimensional image by a parallax barrier method. An image viewed by a viewer is formed on an image display panel 30 shown in FIG. 9. In order to make it possible to view a three-dimensional image, right eye pixels (r) on which a right eye image is displayed and left eye pixels (l) on which a left eye image is displayed are formed on the image display panel 30. The arrangement relationship between the right eye pixels (r) and the left eye pixels (l) will be described later.

The right eye image and the left eye image can be simultaneously picked up by two cameras for the right and left eyes, for example. Both images thus obtained include parallax information required for a human being to view a three-dimensional image by binocular parallax.

A parallax barrier 31 is arranged ahead of the image display panel 30. Apertures 31a are formed in a vertical stripe shape in the parallax barrier 31. The spacing between the apertures 31a is set in correspondence with the arrangement of the right eye pixels (r) and the left eye pixels (l). The right eye image and the left eye image are separated by the parallax barrier 31, to respectively enter the right eye 2R and the left eye 2L of the viewer.

FIG. 10 is a schematic view showing the principle of displaying a three-dimensional image by a method of slitting a light source. In the method shown in FIG. 10, a slit 33 is arranged ahead of a light source 32 to emit light in a vertical stripe pattern. The light source itself may emit light in a vertical stripe pattern. Also in the method of slitting a light source, the same function as that in the above described parallax barrier method is obtained, so that a right eye image and a left eye image are separated to respectively enter the right eye 2R and the left eye 2L of a viewer.

FIG. 11 is a schematic view showing the principle of displaying a three-dimensional image by a lenticular method. A lenticular plate 1 is one type of lens having a plurality of cylindrical lenses in a vertical stripe pattern. A pitch between the cylindrical lenses of the lenticular plate 1 almost coincides with the distance corresponding to two projected pixels which are formed on a dispersion panel 3, and one of the cylindrical lenses corresponds to the right eye pixel (r) and the left eye pixel (l).

An image displayed on the dispersion panel 3 is separated into a right eye image and a left eye image by the lens refraction function of the lenticular plate 1, and the right eye image and the left eye image respectively enter the right eye 2R and the left eye 2L of a viewer. That is, light emitted from the left eye pixels (l) is incident on only the left eye 2L, and light emitted from the right eye pixels (r) is incident on only the right eye 2R.

FIG. 12 is an enlarged plan view schematically showing a liquid crystal display (LCD) panel which is an image display panel. A square frame shown in FIG. 12 represents a pixel. Right eye pixels (r) and left eye pixels (l) are respectively arranged in the longitudinal direction on a screen, whereby a right eye image (R) and a left eye image (L) in a vertical stripe pattern are formed.

In this LCD panel, a region exists where no pixels are formed between the right eye pixel (r) and the left eye pixel (l). This region is a region where there exist a gate line, a thin film transistor (TFT) or the like for driving a liquid crystal, which is referred to as a black matrix region. In such an LCD panel, a non-image portion exists corresponding to the black matrix region.

If the position of the head of the viewer is shifted rightward or leftward, therefore, the right and left eyes of the viewer view the non-image portion corresponding to the black matrix region, whereby no image information enters the right and left eyes so that the viewer views a black screen.

SUMMARY OF THE INVENTION

An object of the present invention is to overcome the above described conventional disadvantage. Specifically, an object of the present invention is to eliminate or reduce the possibility that no image information enters the right and left eyes of a viewer so that the viewer views a black screen even when the head of the viewer moves rightward or leftward.

Therefore, a three-dimensional display panel according to the present invention comprises an image display panel having a column of right eye pixels arranged with predetermined spacing in the longitudinal direction on a screen and a column of left eye pixels arranged with predetermined spacing in the longitudinal direction on the screen and so adapted that the column of right eye pixels and the column of left eye pixels are arranged alternately in close proximity to each other in the horizontal direction on the screen and the column of right eye pixels and the column of left eye pixels are shifted from each other in the longitudinal direction on the screen to ensure a region where means for switching the respective pixels is formed, and image separating means for separating light from the right eye pixels and light from the left eye pixels to be respectively incident on the right eye and the left eye of a viewer.

The above described "close proximity" means that the column of right eye pixels and the column of left eye pixels are slightly overlapped with each other and are slightly spaced apart from each other in addition to meaning that the column of right eye pixels and the column of left eye pixels are brought into contact with each other.

If the three-dimensional display panel is thus constructed, the column of right eye pixels and the column of left eye pixels are in close proximity to each other in the horizontal direction on the screen, whereby no black matrix region exists between the columns of pixels or the black matrix region is reduced. Even if the position of the head of the viewer is slightly shifted rightward or leftward, therefore, the viewer cannot see non-image portion or views a small part of the non-image portion. Further, both the columns of pixels are shifted from each other in the longitudinal direction on the screen, and the region where means for switching the respective pixels is formed is ensured, thereby to make it possible to drive the pixels without creating a problem.

As the above described image separating means, it is possible to use a lenticular plate, a parallax barrier, or a light source in a stripe pattern. If the lenticular plate is used, the black matrix region on the image display panel exerts a strong effect thereon, whereby the column of right eye pixels and the column of left eye pixels may be slightly overlapped with each other. On the other hand, if the parallax barrier or the slit light source is used, the necessity of eliminating the effect of crosstalk with the right and left images is great, whereby the column of right eye pixels and the column of left eye pixels may be arranged slightly spaced apart from each other.

A three-dimensional display according to the present invention comprises the above described three-dimensional display panel, and comprises rank driving means for successively switching ranks scanned on the three-dimensional display panel for each horizontal scanning period, and column driving means for alternately switching right eye image data and left eye image data for each horizontal scanning period to supply the data to the three-dimensional display panel.

Consequently, a right eye image and a left eye image are alternately displayed in a vertical stripe pattern on the three-dimensional display panel constructed as described above, whereby the viewer can recognize a three-dimensional image through the image separating means.

Furthermore, the three-dimensional display comprises rank driving means for successively switching ranks scanned on the above described three-dimensional display panel for each period which is one-half one horizontal scanning period in an original image signal, and column driving means for compressing right eye image data and left eye image data to a period which is one-half one horizontal scanning period in the original image signal and alternately switching the respective compressed image data for each period which is one-half one horizontal scanning period in the original image signal to supply the compressed image data to the three-dimensional display panel.

If the three-dimensional display is thus constructed, all the original right and left eye image signals can be utilized within one horizontal scanning period, thereby to make it possible to improve resolution in the vertical direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing a three-dimensional display according to the first embodiment of the present invention;

FIG. 5 is a timing chart showing signals at respective points shown in FIG. 4;

FIG. 6 is a block diagram showing a three-dimensional display according to a second embodiment of the present invention;

FIG. 7 is a timing chart showing signals at respective points shown in FIG. 6;

FIG. 9 is a schematic view showing the principle of displaying a three-dimensional image by a parallax barrier method;

FIG. 10 is a schematic view showing the principle of displaying a three-dimensional image by a method of slitting a light source;

FIG. 11 is a schematic view showing the principle of displaying a three-dimensional image by a lenticular method; and FIG. 12 is a diagram showing the arrangement of pixels on an image display panel used in a conventional three-dimensional display.

DESCRIPTION OF THE PREFERRED EMBODIMENTS (Embodiment 1)

The present invention will be described on the basis of drawings showing an embodiment.

Figure 1:
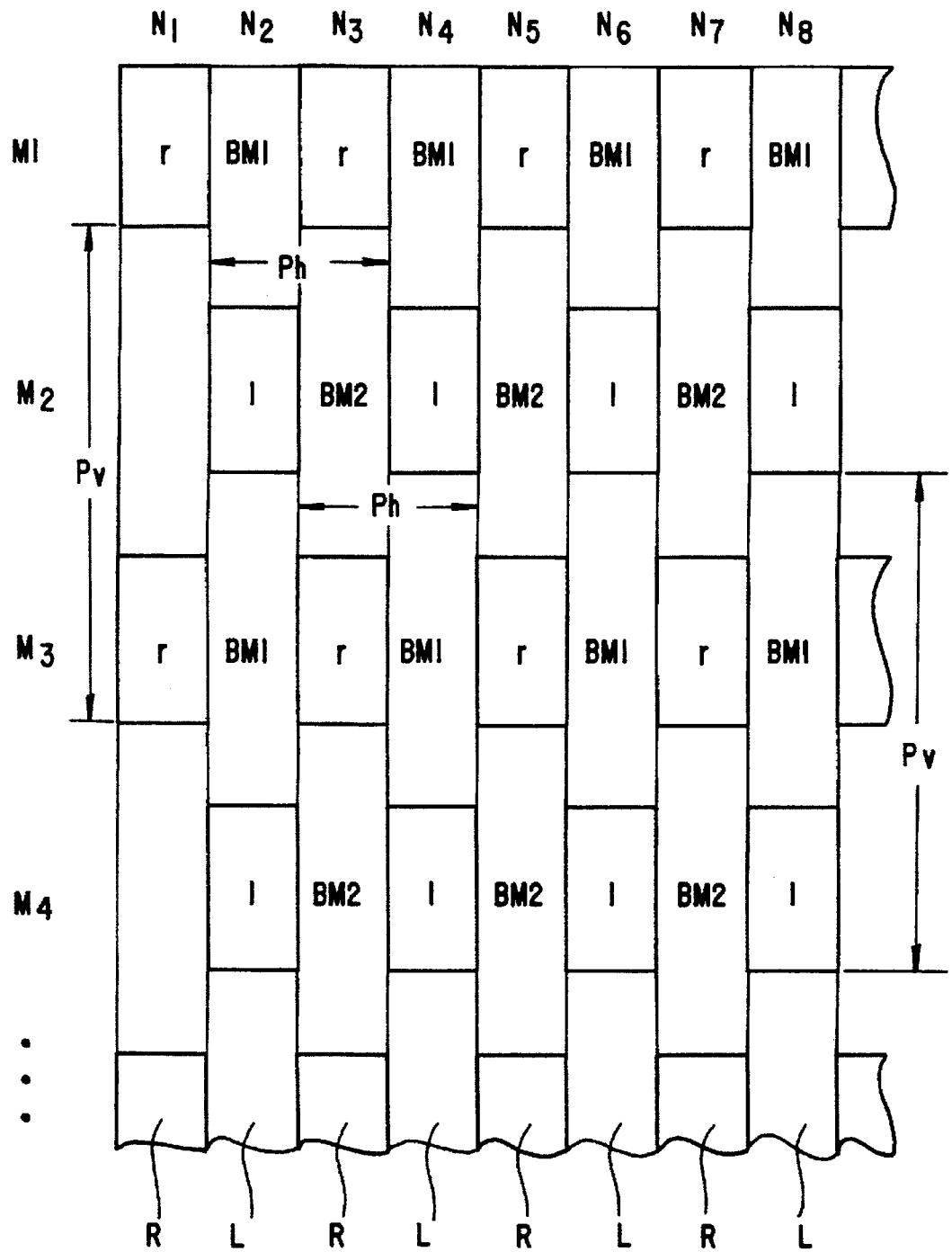
FIG. 1 is a diagram showing the arrangement of pixels on an image display panel used in a three-dimensional display according to the present invention.

FIG. 1 is an enlarged plan view schematically showing a three-dimensional display panel according to the present invention. A square frame shown in FIG. 1 corresponds to one pixel.

In the arrangement of pixels shown in FIG. 1, odd columns $N_1, N_3, \ldots$ are columns formed by arranging right eye pixels (r) with predetermined spacing in the longitudinal direction on a screen. The odd columns are hereinafter mentioned as columns of right eye pixels (R). Even columns $N_2, N_4, \ldots$ are columns formed by arranging left eye pixels (l) with predetermined spacing in the longitudinal direction on the screen. The even columns are hereinafter mentioned as columns of left eye pixels (L). The columns of right eye pixels (R) and the columns of left eye pixels (L) are alternately brought into contact with each other in the horizontal direction on the screen.

Furthermore, the column of right eye pixels (R) and the column of left eye pixels (L) are arranged shifted from each other in the vertical direction on the screen. Specifically, if the above described arrangement of pixels is seen in the rank direction, $M_1, M_3, \ldots$ which are odd ranks are constituted by only the right eye pixels (r), and $M_2, M_4, \ldots$ which are even ranks are constituted by only the left eye pixels (l).

By shifting the above described columns of pixels from each other in the vertical direction on the screen, a black matrix region BM1 is formed between the right eye pixels which are adjacent to each other in the horizontal direction, and a black matrix region BM2 is formed between the left eye pixels which are adjacent to each other in the horizontal direction. In the above described black matrix regions BM1 . . . , BM2, . . . , means for switching the respective pixels can be formed.

In the present embodiment, the right eye pixels (r) and the left eye pixels (l) are formed shifted from each other by one-half a pitch between pixels Ph in the horizontal direction. Since the horizontal width of each of the pixels is made equal to one-half the pitch between pixels Ph, the column of right eye pixels (R) and the column of left eye pixels (L) are brought into contact with each other. That is, it is difficult to bring about both a state where both light from the left eye pixels (l) and light from the right eye pixels (r) are incident on the eyes of the viewer and a state where they are not incident thereon. Consequently, such an image display panel can be used for both a lenticular method and a parallax barrier method, whereby it is very versatile. In addition, the right eye pixels (r) and left eye pixels (l) are formed shifted from each other by only one-half a pitch between pixels Pv in the vertical direction.

Examples of the above described image display panel include an LCD panel. In the present embodiment, the number of scanning lines on the LCD panel is set to 240. That is, the number of scanning lines in the odd ranks composed of the right eye pixels (r) is 120, and the number of scanning lines in the even ranks composed of the left eye pixels (l) is 120.

Description is now made of a three-dimensional display panel which is a combination of the image display panel and image separating means.

Figure 2:
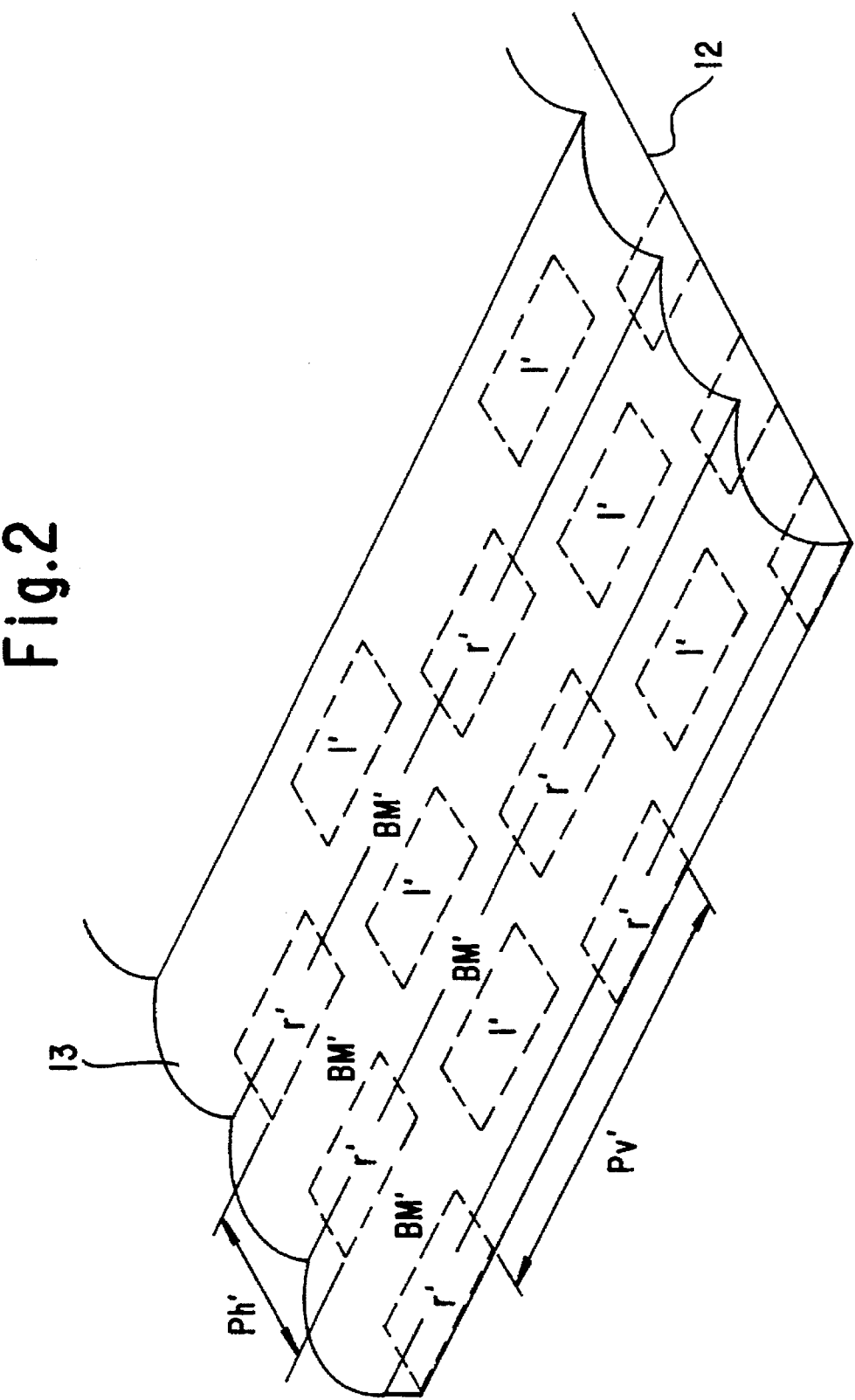
FIG. 2 is an illustration showing the states of pixel images formed on a lenticular plate and a dispersion panel in a three-dimensional display panel according to a first embodiment of the present invention.

FIG. 2 is a perspective view showing the arrangement of pixel images on a lenticular plate 13 which is the image separating means. An image is projected on the lenticular plate 13 by a liquid crystal display (LCD) projector. Examples of the LCD projector include an LCD panel having the arrangement of pixels shown in FIG. 1. A dispersion panel 12 is affixed to the lenticular plate 13. An image projected from the LCD panel is formed on the dispersion panel 12. The lenticular plate 13 separates light from the pixel images into right eye light and left eye light.

A set is provided made of a column of right eye pixels (r') arranged in the longitudinal direction on a screen and a column of left eye pixels (l') arranged in the longitudinal direction on the screen. This set is positioned in one cylindrical lens of the lenticular plate 13.

By the LCD panel having the arrangement of pixels shown in FIG. 1, a pixel image formed on the dispersion panel 12 is shifted by only one-half a pitch between pixels Ph' in the horizontal direction (in the transverse direction) on the screen, and is shifted by only one-half a pitch between pixels Pv' in the vertical direction (in the longitudinal direction) on the screen.

Figure 3:
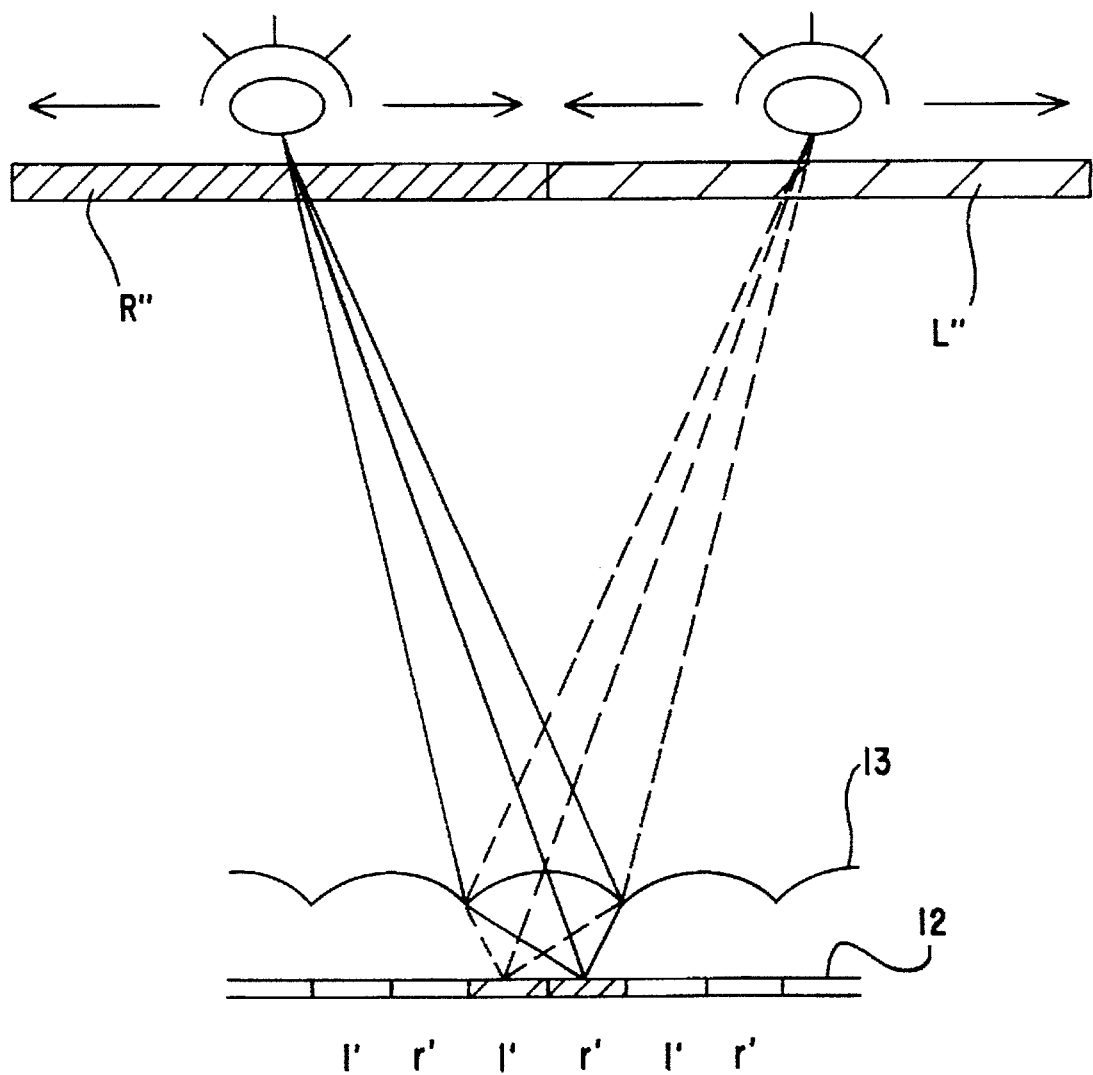
FIG. 3 is a diagram showing the course of light from pixel images in the three-dimensional display panel according to the first embodiment of the present invention.

FIG. 3 is a schematic view showing how a viewer views pixel images formed on the dispersion panel 12 through the lenticular plate 13. As apparent from the foregoing description, no region exists in the horizontal direction on a screen where no columns of pixel images are formed (no gap between the columns of pixel images) in the pixel images formed on the dispersion panel 12. In this manner whereby a region (R") where light from right eye pixels (r') is gathered and a region (L") where light from left eye pixels (l') is gathered can be continuously viewed without a gap in the horizontal direction on the screen in a proper viewing position. Therefore, the possibility of a non-image region being viewed is eliminated even if the head of the viewer horizontally moves.

Description is now made of a three-dimensional display.

FIG. 4 is a block diagram showing the three-dimensional display. The three-dimensional display supplies right and left image data to a three-dimensional display panel 9 having the arrangement of pixels shown in FIG. 1.

A right eye image signal is inputted to a Y/C separating circuit 3. The Y/C separating circuit 3 separates the image signal into a luminance signal (Y) and a chrominance signal (C). In addition, a left eye image signal is inputted to a Y/C separating circuit 4. The Y/C separating circuit 4 separates the image signal into a luminance signal (Y) and a chrominance signal (C).

A timing signal generating circuit 5 outputs timing signals which are switched for each horizontal scanning period (1H) in synchronization with a horizontal synchronizing signal in the left eye image signal. The timing signal is a signal alternately switched between "1" and "0" for each horizontal scanning period.

An analog switch 6 has two sets of switch portions. The luminance signals in the right eye image signal and the left eye image signal are respectively inputted to two signal input terminals 6a and 6b which constitute the first set of switch portions. Either one of the luminance signals is outputted from a signal output terminal 6c. On the other hand, the chrominance signals in the right eye image signal and the left eye image signal are respectively inputted to two signal input terminals 6d and 6e which constitute the second set of switch portions. Either one of the chrominance signals is outputted from a signal output terminal 6f. The first set of switch portions and the second set of switch portions are switched in synchronization with each other. The switching is achieved for each horizontal scanning period on the basis of the timing signal from the timing signal generating circuit 5.

The luminance signal and the chrominance signal which are outputted from the analog switch 6 are inputted to a demodulating circuit 7. The demodulating circuit 7 generates signals R, G and B of the three primary colors from the luminance signal and the chrominance signal to output the signals of the three primary colors.

The signals of the three primary colors are inputted to a voltage converting circuit 8. The voltage converting circuit 8 converts the signals of the three primary colors into voltages for driving a liquid crystal.

An LCD panel 9 has the arrangement of pixels shown in FIG. 1.

Signals from the voltage converting circuit 8 are inputted to a column driving circuit 10. The column driving circuit 10 controls the driving of columns of pixels on the LCD panel 9.

A rank driving circuit 11 designates ranks scanned on the LCD panel 9.

The timings of the operations of the demodulating circuit 7, the voltage converting circuit 8, the column driving circuit 10, and the rank driving circuit 11 are controlled by the timing signals from the timing signal generating circuit 5.

FIG. 5 is a timing chart respectively showing the contents of signals at points (a), (b) and (c) shown in FIG. 4. The operations of the circuits shown in FIG. 4 will be described using FIG. 5.

First, the right eye image signal is separated into the luminance signal and the chrominance signal by the Y/C separating circuit 3, and the luminance signal and the chrominance signal are respectively inputted to the signal input terminal 6a and the signal input terminal 6d of the analog switch 6. The left eye image signal is also separated into the luminance signal and the chrominance signal by the Y/C separating circuit 4, and the luminance signal and the chrominance signal are respectively inputted to the signal input terminal 6b and the signal input terminal 6e of the analog switch 6.

The luminance signals and the chrominance signals from the Y/C separating circuits 3 and 4 are respectively inputted to the above described analog switch 6. The analog switch 6 switches signals to be outputted between the right eye luminance signal and chrominance signal and the left eye luminance signal and chrominance signal by the above described timing signal.

More specifically, when the signals inputted to the analog switch 6 are signals to odd ranks on the LCD panel 9, the timing signal becomes "1", whereby the analog switch 6 selects the signal input terminals 6a and 6d, to output the right eye luminance signal and chrominance signal. On the other hand, when the signals inputted to the analog switch 6 are signals to even ranks on the LCD panel 9, the timing signal becomes "0", whereby the analog switch 6 selects the signal input terminals 6b and 6e, to output the left eye luminance signal and chrominance signal.

The analog switch 6 performs the switching operation in the above described manner, thereby to generate a composite image signal. FIG. 5 illustrates a left eye image signal L1, L2, . . . and a right eye image signal R1, R2, . . . without separating the image signal into luminance and chrominance signals for convenience.

The composite image signal outputted from the analog switch 6 is converted into signals R, G and B of the three primary colors by the demodulating circuit 7. The signals of the three primary colors are further converted into desired voltages by the voltage converting circuit 8, and the voltages are supplied to the column driving circuit 10.

The column driving circuit 10 alternately supplies right eye image data based on R1, R3, . . . shown in FIG. 5 and left eye image data based on L2, L4, . . . shown in FIG. 5 to the LCD panel 9 for each horizontal scanning period in synchronization with the above described timing signal.

The rank driving circuit 11 successively switches lines to be scanned, for example, the first line, the second line, the third line, . . . for each horizontal scanning period in synchronization with the timing signal from the timing signal generating circuit 5.

Therefore, the column driving circuit 10 supplies right eye image data to the LCD panel 9 when the rank driving circuit 11 designates odd ranks, while supplying left eye image data to the LCD panel 9 when the rank driving circuit 11 designates even ranks. Consequently, the right eye image data and the left eye image data are respectively supplied to the right eye pixels and the left eye pixels which are formed on the LCD panel 9.

(Embodiment 2)

A three-dimensional display according to another embodiment will be described on the basis of FIGS. 6 and 7. The three-dimensional display according to the present embodiment overcomes the disadvantage of the above described embodiment that resolution in the vertical direction on a screen is low.

In the three-dimensional display according to the above described embodiment, a right eye image signal and a left eye image signal are alternately extracted for each horizontal scanning period and are inputted to an LCD panel, and the remaining image signals are not utilized. That is, right eye image signals R1, R3, . . . and left eye image signals L2, L4, . . . are inputted to the LCD panel, and the remaining right eye image signal R2, R4, . . . and the remaining left eye image signals L1, L3, . . . are not utilized. Therefore, resolution in the vertical direction is reduced to half.

FIG. 6 is a block diagram showing a three-dimensional display according to a second embodiment in which the above described problem is solved. FIG. 7 is a timing chart respectively showing the contents of signals at points (a), (b), (c), (d) and (e) shown in FIG. 6.

A right eye image signal is inputted to a demodulating circuit 14. The demodulating circuit 14 generates signals R, G and B of the three primary colors and outputs the signals. A left eye image signal is inputted to a demodulating circuit 15. The demodulating circuit 15 generates signals R, G and B of the three primary colors and outputs the signals.

An A/D (analog-to-digital) converting circuit 16 converts the signals R, G and B of the three primary colors from the demodulating circuit 14 into digital signals and outputs the digital signals. An A/D converting circuit 17 converts the signals R, G and B of the three primary colors from the demodulating circuit 15 into digital signals and outputs the digital signals.

A double speed converting circuit 18 outputs the digital signals from the A/D converting circuit 16 at double the speed for each horizontal scanning period in an original signal. The double speed converting circuit 19 outputs the digital signals from the A/D converting circuit 17 at double the speed for each horizontal scanning period in the original signal.

A multiplexer 20 has three sets of switch portions. The R signals in the right eye image signal and the left eye image signal are respectively inputted to two signal input terminals 20a and 20b which constitute the first set of switch portions, and either one of the R signals is outputted from a signal output terminal 20c. In addition, the G signals in the right eye image signal and the left eye image signal are respectively inputted to two signal input terminals 20d and 20e which constitute the second set of switch portions, and either one of the G signals is outputted from a signal output terminal 20f. Further, the B signals in the right eye image signal and the left eye image signal are respectively inputted to two signal input terminals 20g and 20h which constitute the third set of switch portions, and either one of the B signals is outputted from a signal output terminal 20i.

The first set of switch portions, the second set of switch portions, and the third set of switch portions are switched in synchronization with each other. This switching is achieved on the basis of a timing signal from a timing signal generating circuit 22.

A D/A (digital-to-analog) converting circuit 21 converts the digital signals R, G and B of the three primary colors which are selected by the multiplexer 20 into analog signals and outputs the analog signals.

The three analog signals of the three primary colors are inputted to a voltage converting circuit 23. The voltage converting circuit 23 converts the analog signals of the three primary colors into voltages for driving a liquid crystal.

An LCD panel 24 has the arrangement of pixels shown in FIG. 1, and the density of the pixels doubles (480) in the vertical direction.

Signals from the voltage converting circuit 23 are inputted to a column driving circuit 25. The column driving circuit 25 controls the driving of columns of pixels on the LCD panel 24.

A rank driving circuit 26 designates ranks scanned on the LCD panel 24.

The timings of the operations of the demodulating circuits 14 and 15, the A/D converting circuits 16 and 17, the double speed converting circuits 18 and 19, the multiplexer 20, the D/A converting circuit 21, the voltage converting circuit 23, the column driving circuit 25, and the rank driving circuit 26 are controlled by timing signals from the timing signal generating circuit 22.

Description is now made of the operations of the above described circuits.

A right eye image signal and a left eye image signal which are obtained by the Y/C separation are respectively converted into chrominance signals R, G and B by the demodulating circuits 14 and 15. The chrominance signals are respectively converted into 8-bit digital signals by the A/D converting circuits 16 and 17.

The above described digital signals are respectively repeatedly outputted at double the speed for each horizontal scanning period in the original signal by the double speed converting circuits 18 and 19. That is, each of the double speed converting circuits 18 and 19 compresses the input signal to a period which is one-half one horizontal scanning period in the original signal, and outputs the compressed signal twice for each horizontal scanning period in the original signal.

Digital signals obtained by the double speed conversion are selectively outputted by the multiplexer 20 which is driven by the timing signal. For example, it is assumed that the timing signal is "0" during the first half of one horizontal scanning period in the original signal, while being "1" during the latter half thereof. In this case, the multiplexer 20 outputs the right eye digital signals R, G and B when the timing signal is "0", while outputting the left eye digital signals R, G and B when the timing signal is "1".

Specifically, the multiplexer 20 outputs the right eye digital signals R, G and B during the first half of one horizontal scanning period in the original signal, while outputting the left eye digital signals R, G and B during the latter half thereof.

The R, G and B digital signals outputted by the multiplexer 20 are converted into analog signals by the D/A converting circuit 21, and the analog signals are converted into voltages for driving a liquid crystal by the voltage converting circuit 23, after which the voltages are supplied to a column driving circuit 25.

The ranks scanned on the LCD panel 24 are successively switched for each period which is one-half one horizontal scanning period in the original signal by a rank driving circuit 26.

In the second embodiment, therefore, the right eye image signal and the left eye image signal in one horizontal scanning period are respectively compressed to a period which is one-half one horizontal scanning period in the original signal, and the compressed right eye image signal is utilized during the first half of one horizontal scanning period in the original signal and the compressed left eye image signal is utilized during the latter half thereof, whereby both the right eye image signal and the left eye image signal can be utilized. Consequently, the resolution in the vertical direction on the screen can be increased, as compared with that in the embodiment 1.

Although the three-dimensional displays described in the foregoing embodiments are projection type displays using a projector, the present invention is also applicable to a direct view type display for directly viewing an LCD panel.

Figure 8:
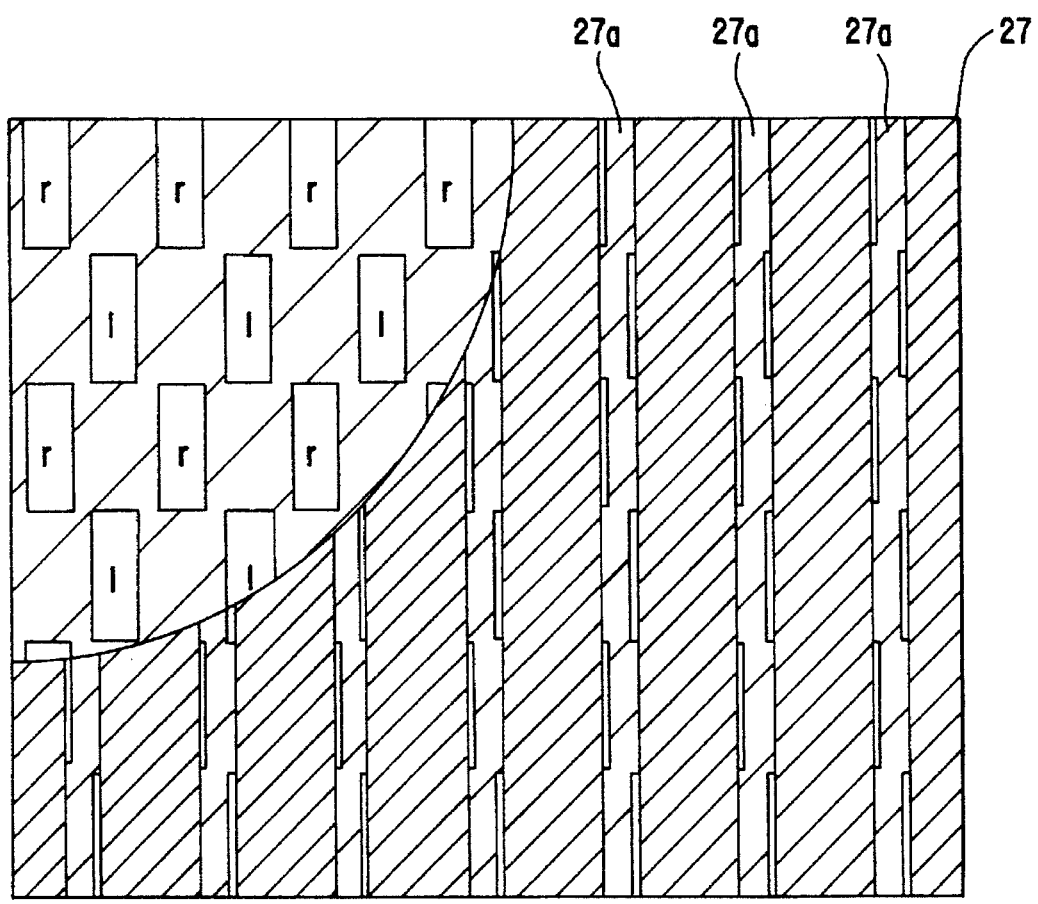
FIG. 8 is diagram showing a three-dimensional display panel according to a third embodiment of the present invention, in which a parallax barrier is partially fractured.

Furthermore, although in the above described embodiments, the lenticular plate is used as image separating means, a parallax barrier may be used in place of the lenticular plate. FIG. 8 is a plan view showing a three-dimensional display panel in a case where the parallax barrier is used, in which the parallax barrier is partially fractured. In a parallax barrier 27, apertures 27a . . . in a vertical stripe pattern are arranged in correspondence with the arrangement of pixels on an LCD panel. The principle of displaying a three-dimensional image in a case where the parallax barrier 27 is used is the same as the principle shown in FIG. 9. If the parallax barrier 27 is used, the necessity of eliminating the effect of crosstalk with right and left images is great. Accordingly, the column of right eye pixels and the column of left eye pixels are arranged slightly spaced apart from each other, as shown in FIG. 8.

Additionally, a slit light source may be used as image separating means. Even when the slit light source is used, slit portions correspond to the arrangement of pixels on the LCD panel. The principle of displaying a three-dimensional image in this case is the same as the principle shown in FIG. 10.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional display panel comprising:

an image display panel directly controlled by image signals to have a column of right eye pixels arranged with predetermined spacing in the longitudinal direction on a screen and a column of left eye pixels arranged with predetermined spacing in the longitudinal direction on the screen, said column of right eye pixels and said column of left eye pixels being arranged alternately in close proximity to each other in the horizontal direction on the screen and shifted from each other in the longitudinal direction on the screen to ensure a region where means for switching the respective pixels is formed; and image separating means for separating light from said right eye pixels and light from said left eye pixels to be respectively incident on the right eye and the left eye of a viewer.

2. The three-dimensional display panel according to claim 1, wherein said image display panel is a liquid crystal display panel.

3. The three-dimensional display panel according to claim 1, wherein said image separating means is a lenticular plate.

4. The three-dimensional display panel according to claim 1, wherein said image separating means is a parallax barrier.

5. The three-dimensional display panel according to claim 1, wherein said image separating means is a slit light source.

6. A three-dimensional display comprising:

an image display panel having a column of right eye pixels arranged with predetermined spacing in the longitudinal direction on a screen and a column of left eye pixels arranged with predetermined spacing in the longitudinal direction on the screen and so adapted that said column of right eye pixels and said column of left eye pixels are arranged alternately in close proximity to each other in the horizontal direction on the screen and are shifted from each other in the longitudinal direction on the screen to ensure a region where means for switching the respective pixels is formed;

image separating means for separating light from said right eye pixels and light from said left eye pixels to be respectively incident on the right eye and the left eye of a viewer;

rank driving means for successively switching ranks scanned on said image display panel for each horizontal scanning period; and column driving means for alternately switching right eye image data and left eye image data for each horizontal scanning period to supply the data to the image display panel.

7. The three-dimensional display according to claim 6, wherein said image display panel is a liquid crystal display panel.

8. The three-dimensional display according to claim 6, wherein said image separating means is a lenticular plate.

9. The three-dimensional display according to claim 6, wherein said image separating means is a parallax barrier.

10. The three-dimensional display according to claim 6, wherein said image separating means is a slit light source.

11. A three-dimensional display comprising:

an image display panel having a column of right eye pixels arranged with predetermined spacing in the longitudinal direction on a screen and a column of left eye pixels arranged with predetermined spacing in the longitudinal direction on the screen and so adapted that said column of right eye pixels and said column of left eye pixels are arranged alternately in close proximity to each other in the horizontal direction on the screen and are shifted from each other in the longitudinal direction on the screen to ensure a region where means for switching the respective pixels is formed;

image separating means for separating light from said right eye pixels and light from said left eye pixels to be respectively incident on the right eye and the left eye of a viewer;

rank driving means for successively switching ranks scanned on said image display panel for each period which is one-half one horizontal scanning period in an original image signal; and column driving means for compressing right eye image data and left eye image data to a period which is one-half one horizontal scanning period in the original image signal and alternately switching the respective compressed image data for each period which is one-half one horizontal scanning period in the original image signal to supply the compressed image data to the image display panel.

12. The three-dimensional display according to claim 11, wherein said image display panel is a liquid crystal display panel.

13. The three-dimensional display according to claim 11, wherein said image separating means is a lenticular plate.

14. The three-dimensional display according to claim 11, wherein said image separating means is a parallax barrier.

15. The three-dimensional display according to claim 11, wherein said image separating means is a slit light source.

16. A three-dimensional display panel comprising:

an image display panel directly controlled by image signals to have an odd rank of pixels formed by arranging only one of right eye pixels and left eye pixels, and an even rank of pixels formed by arranging only the other of the right eye pixels and the left eye pixels, the position of said right eye pixels and the position of said left eye pixels being shifted by a distance which is one-half a horizontal pitch between pixels in the horizontal direction; and image separating means for separating light from said right eye pixels and light from said left eye pixels to be respectively incident on the right eye and the left eye of a viewer.

17. The three-dimensional display panel according to claim 16, wherein said image display panel is a liquid crystal display panel.

18. The three-dimensional display panel according to claim 16, wherein said image separating means is a lenticular plate.

19. The three-dimensional display panel according to claim 16, wherein said image separating means is a parallax barrier.

20. The three-dimensional display panel according to claim 16, wherein said image separating means is a slit light source.

* * * * *